May 12, 1970     J. W. JENKINS     3,511,888

PARAFFIN CONVERSION CATALYST AND PROCESS

Filed Feb. 8, 1968

INVENTOR:
J. W. JENKINS
BY:

*Harold L. Denkler*

HIS ATTORNEY 3,511,888
PARAFFIN CONVERSION CATALYST AND
PROCESS
John W. Jenkins, Seabrook, Tex., assignor to Shell Oil
Company, New York, N.Y., a corporation of Delaware
Filed Feb. 8, 1968, Ser. No. 703,970
Int. Cl. C07c 15/00; C10g 35/06
U.S. Cl. 260—673.5                                    11 Claims

ABSTRACT OF THE DISCLOSURE

A noble metal and tin or bismuth disposed on silica gel is an active and selective catalyst in a process for paraffin dehydrogenation and dehydrocyclization.

BACKGROUND OF THE INVENTION

Field of the invention

Figure 1:
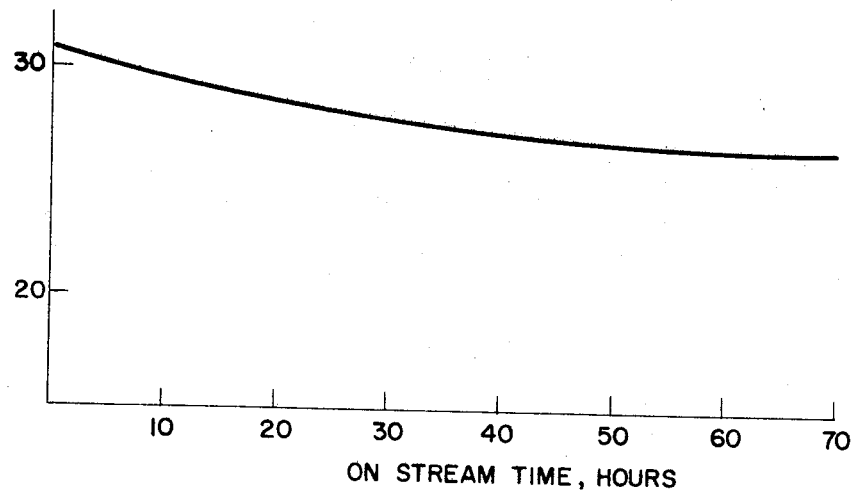

This invention relates to a catalyst composition and a process for paraffin dehydrogenation and dehydrocyclization. More specifically, it relates to a nable metal catalyst modified with tin or bismuth disposed on a relatively inert support.

Description of the prior art

The catalytic conversion of paraffins to olefins and aromatics is well known and of established commercial importance. Not only is paraffin dehydrocyclization suitable for the production of desirable aromatics but also finds particular applicability in upgrading low octane paraffinic feed stocks, readily available in most petroleum refineries, to high octane motor fuel components. A reaction intimately related to dehydrocyclization is the dehydrogenation of paraffins. Of considerable commercial importance, for example, is the dehydrogenation of n-butane of n-butylenes and ultimately to butadiene. Such processes are characteristically operated for very short cycle-times because of extensive fouling of the catalysts.

Numerous catalysts have been proposed for these dehydrogenation reactions, such as chromia-alumina, molybdenum-alumina and more recently noble metal-alumina. Platinum catalysts have long been known, of course, for catalytic reforming of naphthenic fractions where aromatics are produced primarily by dehydrogenation of naphthenes. It is known that dehydrocyclization is one of the reactions which occur in reforming of practical, paraffin-containing, feed stocks. Duel functional platinum on acidic alumina reforming catalysts are, however, not suitable for efficient dehydrocyclization, largely due to the acidic activity necessary for isomerization and hydrocracking reactions desired in reforming. It is commonly accepted that these catalysts promote cyclization via a $C_5$ ring intermediate; for example, the conversion of hexane to methyl cyclopentane. Because of high ring opening activity favored over direct cyclization to $C_6$ rings with acidic reforming catalysts, the net production of aromatics from n-paraffins is small. Ring opening and isomerization activity is, of course, desirable in reforming but not in dehydrogenation processes.

Chromia-alumina catalysts widely used for dehydrocyclization give good ring retention but have poor process stability and require frequent regeneration.

In my copending application No. 596,456, filed Nov. 23, 1966, it is proposed to use a sulfided noble metal catalyst for dehydrogenation-dehydrocyclization. While this catalyst is an excellent one it has the disadvantage that a minor amount of sulfur must continuously be introduced with the feed to maintain the catalyst in its sulfided form in order to realize the full advantage of the invention. Moreover, the catalyst is not as easily regenerated as desired.

It has now been discovered that the addition of tin or bismuth to a supported noble metal catalyst selectively poisons those reactions responsible for rapid catalyst deactivation, improves yields and selectivity to desired products and markedly improves catalyst regenerability. Unlike the previously proposed catalyst, it is not required, nor desired, that sulfur or sulfur compounds be continuously introduced to maintain catalyst performance.

SUMMARY OF THE INVENTION

This invention is a catalyst and process for paraffin, especially $C_2-C_{20}$ paraffins, dehydrogenation-dehydrocyclization therewith comprising a minor amount of noble metal and a modifying component consisting of either tin or bismuth supported on a relatively inert silica gel carrier. Tin is especially preferred as the modifying component.

The catalyst comprises a platinum metal, platinum or palladium, and a modifying component selected from tin and bismuth supported on a silica gel. The concentration of the platinum metal and modifying metals are in the range of 0.01 to about 5%, preferably to about 1%, for each component based on the total supported composite. It is preferred that the weight ratio of modifying metal to platinum metal not exceed about 2. Higher relative levels of modifying metals tend to depress catalyst activity.

Silica gel is a suitable support since it does not have high catalytic acidity which results in excessive ring opening activity. Silica gel of high surface area is an especially suitable and preferred support. Advantageously, the silica has surface area in the range of about 300 to 750 sq. meters/gram. Alumina is inadequate as a support as will be illustrated in the examples.

Any of the various methods for adding the metallic components to the silica gel support can be used. It is expedient to impregnate or ion-exchange the support with ionic solutions of the metal components. Any suitable compound of the melal, preferably water soluble, can be used. For example, platinum metal can be incorporated from compounds such as chloroplatinic acid or platinous tetra-amine compounds such as platinous tetra-amine chloride, platinous tetra-amine nitrate or platinous tetra-amine hydroxide. Tin and/or bismuth can be incorporated from salts of mineral acids, as for example, stannic or bismuth chloride, nitrate or sulfate etc. Alternatively, the metal component can be provided by mixing an aqueous dispersion of a sulfide, such as platinum sulfide, with the refractory oxide. The metals can be added separately or from a common solution. After addition of the metal components, the catalyst is usually dried and preferably calcined in air. Calcination in air, of course, converts the metal to the oxide. A calcination temperaure in the range from about 600–900° F. is advantageous, although higher or lower temperatures can be used if desired.

Catalysts prepared according to the invention can be used in any convenient form for use in a fixed catalytic bed, for example, pellets, granules, tablets, extrudates, etc. Fairly uniform particles of about $\frac{1}{16}$ to about $\frac{3}{8}$ inch are particularly satisfactory. Catalysts may also be used in forms suitable for fluidized, slurry or moving bed processes such as powders, finely ground granules, etc.

Dehydrocyclization of paraffins to aromatics is carried out at a temperature in the range from about 750–1200° F. and preferably from about 900–1100° F. In general, the pressure is relatively low, ranging from subatmospheric pressure of about 2 p.s.i.a. to an elevated pressure of about 100 p.s.i.a. or more. Preferred pressures are in the range from about 5 p.s.i.a. to 75 p.s.i.a. Low pressure tends to favor dehydrocyclization. Weight hourly space velocity can vary over a considerable range, generally from about 0.1 to about 10 and preferably from about 0.25 to 5.

Although there is a net production of hydrogen in the dehydrocyclization reaction the presence of added hydrogen is beneficial to catalyst stability. The molar ratio of hydrogen to hydrocarbon can vary from as low as about 0.1:1 to as high as about 5:1, although lower and higher ratios can be used if desired. Low hydrogen/oil ratios tend to favor dehydrocyclization. Pure hydrogen need not be used and it is often expedient to use available hydrogen containing streams, such as reformer off-gas etc. Recycle hydrogen can be used.

Although paraffins which can be dehydrocyclized by the process of the invention comprise paraffins ranging from $C_6$–$C_{20}$, individually or in admixture, the process of the invention is particularly suitable for lower acyclic paraffins, e.g., $C_6$–$C_{10}$ paraffins. The lower paraffins are generally considered to be more difficult to dehydrocyclize. The paraffin can also be in admixture with other hydrocarbons. Suitable feeds can range from hexane, heptane, or other individual hydrocarbon fractions available in a petroleum refinery to mixed hydrocarbon fractions comprising 60% v., preferably 70% v. or more, paraffins. Such fractions can be straight-run fractions, raffinates, e.g., $C_6$–$C_8$ raffinates resulting from solvent extraction of aromatic hydrocarbons, molecular sieve or other processes for the separation of normal paraffins from non-normal paraffins and the like.

The hydrocarbon feed may contain cyclic paraffins although catalyst stability is slightly affected adversely by cyclopentane srtuctures. The effect on stability of cyclopentane structures is much less than is the case with chromia alumina catalyst. Indeed, methylcyclopentane is a significant product of normal hexane dehydrocyclization in the present process, particularly at low ratio of modifying metal to platinum metal. In general the amount of methylcyclopentane decreases as the modifying metal content of the catalyst increases. However, this cyclic has a much smaller poisoning effect with this catalyst than with chromia alumina and little, of any, subsequent ring openings as in reforming processes. Also, in contrast, it may be noted that in conventional catalytic reforming of naphthas with a catalyst of platinum on halogenated alumina, cyclization to five-membered rings followed by dehydroisomerization to aromatics occurs. However, since the ratio of ring opening of five-membered rings to ring closure to five-membered rings is governed by an equilibrium constant, any increase in cyclization rate automatically increases ring opening rate. The net result, then, with pratcical reforming feeds containing methylcyclopentane is that five-membered rings are usually destroyed faster than they are produced. In addition, direct cyclization to six-membered rings is not favored and due to closure to the five-membered structure and subsequent isomerization and ring opening, the net conversion of $C_6+$ paraffins to aromatics is low.

In general, aromatic hydrocarbons produced in the dehydrocyclization reaction comprise at least about 15% by weight and usually at least about 25% by weight of the liquid hydrocarbon product. The aromatics can be recovered by any suitable separation process, e.g., extraction by means of an aromatic selective solvent.

Dehydrogenation of paraffins to olefins is carried out at a temperature in the range from about 750–1290° F. and preferably from about 930–1200° F. for the lower paraffins. In general, the pressure is relatively low and can be in the range from subatmospheric pressures of about 1 p.s.i.a. to elevated pressure of about 60 p.s.i.a. or more. Preferred pressures are in the range from about 5 p.s.i.a. to 45 p.s.i.a. Weight hourly space velocity can vary over a considerable range, such as from about 0.1 to about 20 and preferably from about 1 to 5.

There is also a net production of hydrogen in the dehydrogenation reaction, but as in the case of dehydrocyclization the presence of added hydrogen is beneficial to catalyst stability. The molar ratio of hydrogen to hydrocarbon can vary from as low as about 0.1:1 to as high as 5:1, although lower and higher ratios can be used if desired. Pure hydrogen need not be used. Hydrogen containing streams such as reformer off-gas are suitable. Recycle hydrogen can be used.

While paraffins which can be dehydrogenated by the process of the invention comprise paraffins ranging from $C_2$–$C_{20}$, individually or in admixture, the process of the invention is particularly suitable for lower paraffins, e.g., $C_2$ through $C_5$ paraffins. The lower paraffins are generally considered to be more difficult to dehydrogenate than higher molecular weight paraffins. The paraffin can also be in admixture with other hydrocarbons. Sutiable feeds can range from ethane, propane, or other individual hydrocarbon fractions available in a petroleum refinery to mixed hydrocarbon fractions comprising 60% v., preferably 70% v. or more paraffins. The paraffin is dehydrogenated to the corersponding olefin. For example, propane, butane, pentane and cyclopentane are dehydrogenated primarily to propylene, butylene, amylene and cyclopentene, respectively, with a minor amount being cracked to lower hydrocarbons. The olefins can be recovered from the dehydrogenation zone effluent by suitable means known in the art.

During use in both dehydrocyclization and dehydrogenation, the catalyst becomes deactivated primarily due to accumulation of carbonaceous deposits on the catalyst. It is a significant advantage of the catalyst of the present invention that the catalyst is easily regenerated by a simple carbon burn off. Regeneration may be accomplished by contacting the catalyst with an oxygen containing gas at sufficiently high temperature to burn the carbonaceous deposits. During the initial phase of carbon burn off, a low concentration of oxygen in an inert gas should be used. It is appropriate to use a gas containing up to about 2% oxygen which may be formulated by mixing air with a suitable inert gas such as nitrogen. Gases containing catalyst poisons such as carbon monoxide should, of course, be avoided. It is especially preferred that the catalyst be given an initial carbon burn off with a low oxygen content gas (up to about 2%) followed by contact with higher concentrations of oxygen as, for example, full air. The use of higher concentration aids in substantially complete removal of carbonaceous deposits.

Excessive temperature should be avoided—temperatures above about 900–950° F. tend to agglomerate the platinum metal and reduce the available catalytically active metal surface area. It is preferred that the regeneration take place at a temperature of about 800° F.

The processes of the invention are carried out by periodically discontinuing the hydrocarbon conversion process and subjecting the catalyst to a regeneration procedure as outlined above.

The following examples illustrate the process of the invention and its advantages.

EXAMPLE I

A catalyst was prepared according to the invention by dissolving 2.73 gm. of chloroplatinic acid

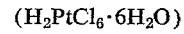

$(H_2PtCl_6 \cdot 6H_2O)$ and 2.95 gm. of stannic chloride $(SnCl_4 \cdot 5H_2O)$ in deionized water to give 38 ml. of aqueous solution. This solution was then added to 100 gm. of silica gel (Davison Grade 40) and the mixture well shaken. The mixture was dried in air at 250° F. and calcined for 1 hour at 750° F.

The catalyst thus prepared had a metal content, determined by X-ray fluorescence, of 1% w. platinum and 1% w. tin.

EXAMPLE II

A catalyst containing 1% w. platinum and 1% w. tin on silica was prepared as described in Example I. For comparison another catalyst was prepared containing 1% w. platinum on silica but no tin.

These catalysts were tested for dehydrocyclization of n-hexane in the presence of hydrogen in a small flow reactor. Conditions were: 975° F., 20 p.s.i.g. pressure, 1 H₂/hydrocarbon mole ratio, 1.0 weight hourly space velocity (WHSV), (weight of n-hexane/hour/weight of catalyst). The results are shown in Table 1.

TABLE 1

| Yields, percent w. basis feed | Catalyst | |
|---|---|---|
| | 1% w. Pt/SiO₂ | 1% w. Pt. +1% w. Sn/SiO₂ |
| H₂ | 2.5 | 3.6 |
| C₁–C₃ | 14.3 | 5.3 |
| C₆+ | 83.1 | 91.1 |
| Benzene (in C₆+) | 24.8 | 23.9 |

Table 1 shows that the selectivity of the catalyst is greatly improved by addition of tin to the catalyst. While benzene make is slightly lower for the improved catalyst, the reduction of cracking significantly improves the economics of the process since recycle operation would result in a far greater total yield of benzene.

EXAMPLE III

A catalyst was prepared containing 5% w. tin on silica and no platinum metal. To 50 gm. of silica gel (Davison Grade 40) was added 7.37 gm. of stannic chloride $$(SnCl_4 \cdot 5H_2O)$$

which was dissolved in 1 N HCl to make 25 cc. of solution. The composite was dried in air at 250° F. and calcined for 1 hour at 750° F.

This catalyst was tested for n-hexane hydrocyclization activity at 975° F., 20 p.s.i.g. pressure, 1 H₂/n-hexane mole ratio and 1 WHSV (weight n-hexane per hour per weight of catalyst).

No benzene was formed and only a trace amount of cracking was detected—the composite being essentially inactive at the conditions applied.

EXAMPLE IV

A platinum/tin on alumina catalyst was prepared similarly to the method described in Example I. The catalyst contained 1% w. platinum and 1% w. tin on a Harshaw alumina. The catalyst was dried at 250° F. in air, calcined for 1 hour at 750° F., and tested for n-hexane hydrocyclization activity at 975° F., 20 p.s.i.g., 1 H₂/n-hexane mole ratio and 0.7 WMSV.

In the first test with no sulfur added to the feed, extensive cracking occurred which raised the temperature of the bed leading to further cracking—a phenomenon known in the art as run away hydrocracking. Such run away did not occur with platinum/tin/silica catalyst prepared according to the invention.

In a second test, 500 p.p.m. sulfur as thiophene was added to the feed. The results are compared with those with a platinum/tin/silica (catalyst of Example I) in Table 2.

TABLE 2

[Conditions—975° F., 20 p.s.i.g. 1 H₂/hexane 0.7 WHSV, 500 p.p.m. sulfur added to feed;

| Hr. on stream | Percent benzene in liquid product | |
|---|---|---|
| | Pt/Sn/Silica | Pt/Sn/Alumina |
| ca. 1 | 45 | 42 |
| 10 | 39 | 36 |
| 20 | 35 | 32 |
| 50 | 30 | 27 |

The catalysts were regenerated as described in Example V.

After regeneration the platinum/tin/silica catalyst had been restored to its initial activity. The alumina catalyst, on the other hand, when tested under the same conditions had lower activity than before regeneration producing only about 20% benzene in the liquid product after 1 hour operation. Thus, the alumina based catalyst has slightly less initial activity, is not regenerable, and must be used with added sulfur in the feed.

EXAMPLE V

A 1% w. platinum, 1% w. tin on silica catalyst as described in Example I was tested in n-hexane dehydrocyclization for stability and regenerability. Conditions were: 750° F., 50 p.s.i.g., 0.5 H₂/hydrocarbon mole ratio, and 1.0 WHSV.

FIG. 1 shows the stability of a catalyst which had been regenerated seven times. Regeneration was by simple carbon burn off at 800° F. using air diluted with nitrogen to give a 2% oxygen concentration. As FIG. 1 shows, the process stability is excellent showing only a small decline in benzene production. Catalyst having only platinum on silica without tin shows much poorer stability after regeneration.

Figure 2:
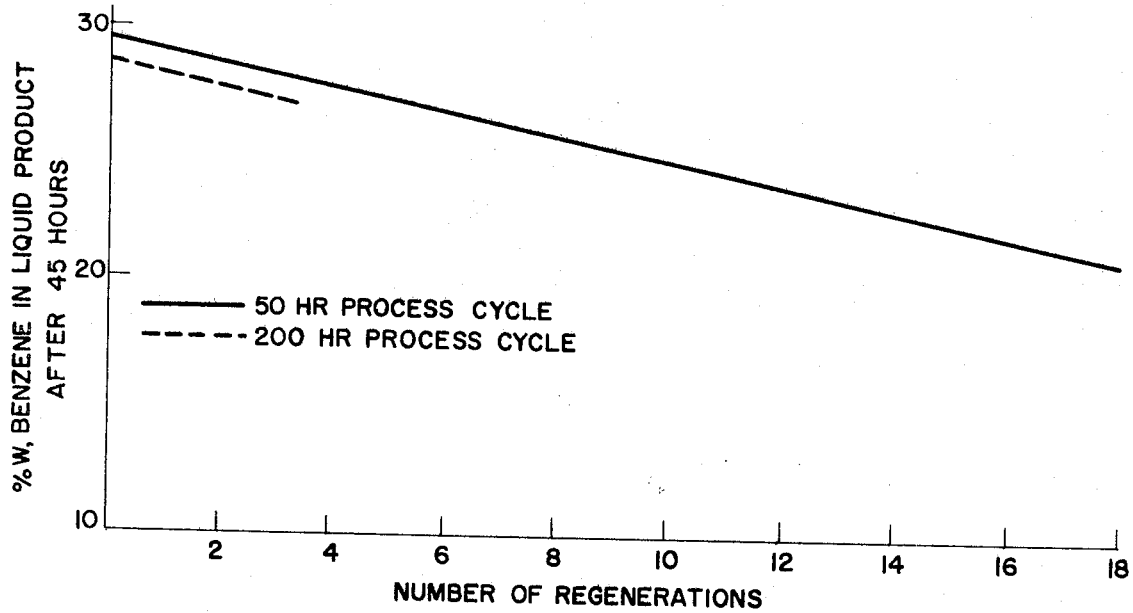

FIG. 2 illustrates the ability of the catalyst to withstand repeated regeneration without serious impairment of catalytic performance. Through a sequence of 18 regenerations, the catalyst showed markedly improved performance over a platinum on silica catalyst without a tin component.

The improved single cycle stability allows the use of 200 hour cycles which is significantly better than 50 hour cycles generally obtained with prior catalysts. The performance of the Pt/tin catalyst in 200 hour cycle operation is also shown in FIG. 2.

EXAMPLE VI

A catalyst was prepared according to the invention by dissolving 2.73 gm. of chloroplatinic acid (H₂PtCl₆·6H₂O) and 1.64 gm. of bismuth trichloride (BiCl₃) in 1 N HCl solution to obtain 38 cc. of solution. This solution was added to 100 gm. of silica gel (Davidson Grade 40) and agitated. The mixture was dried in air at 250° F. and calcined in air at 750° F. The resulting catalyst contained 0.5% w. Bi and 1% Pt.

The catalyst was tested for dehydrocyclization of n-hexane at 975° F., 1 WHSV and 50 p.s.i.g. pressure. Conversion to benzene was about 32% basis feed.

EXAMPLE VII

A catalyst containing 1% w. platinum, 1% w. tin on silica prepared as described in Example I was tested for dehydrogenation of n-butane. The reaction was carried out in a flow reactor at 950° F., 15 p.s.i.a. pressure and 1.0 WHSV. Continuous operation was obtained without intermediate regeneration for a total of 10 hours without change in butane conversion. Distribution of products recovered after 7 hours of operation is shown in Table 3.

TABLE 3

| Component: | Product composition [1] |
|---|---|
| H₂ | 29.4 |
| Methane | 0.9 |
| Ethane/ethylene | 1.6 |
| Propane/propylene | 0.1 |
| n-Butane | 63.3 |
| Isobutane | 3.8 |
| Butylenes | 30.1 |
| Butadiene | 0.5 |
| Xylenes | 0.4 |

[1] Moles basis 100 moles feed.

I claim as my invention:

1. A catalyst for dehydrogenation and dehydrocyclization of paraffin hydrocarbons comprising a platinum metal component, and a modifying metal component selected from the group consisting of tin and bismuth, supported on silica gel.

2. The catalyst of claim 1 wherein the amount of platinum metal is in the range of 0.01 to 5% w., basis finished catalyst, the amount of modifying metal in the range of 0.01 to 5% w., basis finished catalyst.

3. The catalyst of claim 1 wherein the amount of platinum metal is in the range of 0.01 to 1% w., basis finished catalyst and the amount of modifying metal is in the range of 0.01 to 1% w., basis finished catalyst.

4. The catalyst of claim 1 wherein the weight ratio of modifying component to platinum metal component is less than about 2.

5. The catalyst of claim 2 wherein the platinum metal is platinum and the modifying metal is tin and the silica has a surface area in the range of about 300–750 square meters per gram.

6. A process for dehydrocyclization of paraffin hydrocarbons having from about 6 through 20 carbon atoms which comprises contacting the paraffin hydrocarbon at a temperature of about 250° F. to 1200° F. and a pressure of about 2 p.s.i.a. to 100 p.s.i.a. with a catalyst comprising a platinum metal component and a modifying metal component selected from the group consisting of tin and bismuth, and supported on silica gel.

7. The process of claim 6 wherein the catalyst contains from about 0.01% w. to 5% w. of each of the platinum metal and modifying metal and the weight ratio of promoting metal to platinum metal is less than about 2.

8. The process of claim 6 wherein contact with paraffin hydrocarbon is periodically discontinued and the catalyst subjected to an oxidative regeneration for removal of accumulated carbonaceous deposits.

9. A process for dehydrogenating paraffin hydrocarbons having from about two to about five carbon atoms to a corresponding olefin which comprises contacting the paraffin hydrocarbon at a temperature of about 750° to 1290° F. and a pressure of about 1 p.s.i.a. to 60 p.s.i.a. with a catalyst comprising a platinum metal component and a modifying metal component selected from the group consisting of tin and bismuth supported on silica gel.

10. The process of claim 9 wherein the paraffin hydrocarbon is butane.

11. The process of claim 9 wherein contact with paraffin hydrocarbon is periodically discontinued and the catalyst subjected to an oxidative regeneration for removal of accumulated carbonaceous deposits.

References Cited

UNITED STATES PATENTS

| 3,291,755 | 12/1966 | Haensel et al. | 252—464 |
| 2,861,959 | 11/1958 | Thorn et al. | 252—465 |
| 3,297,773 | 1/1967 | Bakker | 260—673.5 |
| 2,905,626 | 9/1959 | Sutherland | 208—97 |
| Re. 26,188 | 4/1967 | Kimberlin et al. | 208—120 |

DELBERT E. GANTZ, Primary Examiner

J. M. NELSON, Assistant Examiner

U.S. Cl. X.R.

208—138; 252—460; 260—683.3